United States Patent Office 3,084,127
Patented Apr. 2, 1963

3,084,127
PROCESS FOR MAKING A CELLULAR MATERIAL FROM A VINYL CHLORIDE POLYMER PLASTISOL
Walter J. Vakousky, Seymour, Conn., assignor to The B. F. Goodrich Company, New York, N.Y., a corporation of New York
No Drawing. Filed Dec. 6, 1960, Ser. No. 73,986
9 Claims. (Cl. 260—2.5)

This invention relates to a process for the manufacture of cellular vinyl chloride polymer materials from a plastisol using a metal borohydride and water to effect the expansion of the plastisol composition and pertains more particularly to the addition of an isocyanate to the plastisol composition to prevent the reaction between the borohydride and water from occurring for a time sufficient to allow the plastisol composition to be charged into a mold or deposited upon a conveyor belt before significant expansion of the plastisol composition occurs.

In the co-pending application of Thomas F. Bush, Serial No. 553,747, filed December 19, 1955, now abandoned, a process for making a vinyl chloride polymer cellular material from a plastisol utilizing certain metal borohydrides as blowing agents is described. In accordance with the process, sodium borohydride, potassium borohydride, rubidium borohydride or cesium borohydride is added to the plastisol along with sufficient water to react with the said borohydride. The hydrogen gas evolved as a product of the reaction of the borohydride with the water expands the plastisol. The rate at which the reaction proceeds can be accelerated by reducing the pH of the water present in the plastisol and/or by heating the plastisol. The reduction of the pH of the water can be effected conveniently by the addition of a water-soluble acidifying material to the plastisol just prior to pouring the plastisol into a mold or onto a moving conveyor belt. It will be appreciated that expansion of the plastisol normally will begin as soon as the borohydride and water (and acidifying material if it is necessary to reduce the pH of the water in the composition) have been added to the plastisol, and that, as a result, the plastisol must be shaped almost immediately after it is compounded. If the plastisol is poured into molds, the mold must be closed before appreciable expansion of the plastisol occurs to prevent loss of the plastisol composition. If a continuous slab of cellular material is to be produced and the plastisol is to be spread onto a moving conveyor belt and allowed to expand thereon, the plastisol must be deposited on the conveyor belt and spread before expansion of the plastisol occurs, since the cellular structure of an expanded plastisol has a tendency to collapse if the plastisol is spread after appreciable expansion has occurred. In view of these considerations, the final compounding of the plastisol composition heretofore has been deferred until just prior to the time it is to be used, and has been carried out in a place adjacent to the place where it is to be utilized. Even then, extreme diligence must be exercised by those handling the composition in order that the plastisol is poured into the mold and the molds closed, or onto the conveyor belt and spread, before appreciable expansion occurs. It can be understood that it would be beneficial if some means were available for preventing the reaction in the plastisol between the metal borohydride and water from occurring for a time sufficient to allow the plastisol composition to be charged into molds or spread onto a conveyor belt before appreciable expansion takes place.

It now has been found that if any isocyanate is added to the plastisol composition before the metal borohydride and water have been combined in the composition, or immediately thereafter, the desired delay in the reaction between metal borohydride and water is realized. The isocyanates useful in this invention are those which have the structural formula $R(NCO)_x$ wherein R is an organic radical free of reactive hydrogen and $x$ is an integer. The organic radical R may be any aliphatic, alicyclic or aromatic radical which is free of reactive hydrogen since it is the $(NCO)^-$ radical of the isocyanate which is responsible for delaying the reaction between the metal borohydride and water. The number of terminal $(NCO)^-$ groups in the isocyanate is not of consequence, although diisocyanate materials are desired, normally, because of their ready commercial availability. Representative isocyanates which conform to the above structural formula are methyl isocyanate, ethyl isocyanate, phenyl isocyanate, α-naphthyl isocyanate, p-nitrophenyl isocyanate, 4-diphenylisocyanate, 2,4-toluene diisocyanate, 2,6-toluene diisocyanate, 2,5-m-xylene diisocyanate, 4-chloro-1,3 phenylene diisocyanate, 3,3'-dichloro-4,4'-biphenylene diisocyanate, meta-phenylene diisocyanate, para-phenylene diisocyanate, 1,5-naphthalene diisocyanate, disphenylmethane-p'-diisocyanate, 4,4'-biphenylene diisocyanate, triphenylmethane-p,p'-diisocyanate, 1,4-tetramethylene diisocyanate, 1,6-hexamethylene diisocyanate, 1,10-decamethylene diisocyanate, 1,4-cyclohexylene diisocyanate, 1,1-dimethyl-1,2-ethylene diisocyanate, triphenylmethane-4,4',4''-triisocyanate, benzene - 1,3,5 - triisocyanate, monochlorobenzene-2,4,6-triisocyanate and diphenyl-2,4,4'-triisocyanate. The isocyanate - modified polyesters having terminal $(NCO)^-$ groups formed by the reaction of a polyester with an excess amount of a diisocyanate or triisocyanate, and the isocyanate-modified polyethers having terminal $(NCO)^-$ groups formed by the reaction of a polyether with an excess amount of a diisocyanate or triisocyanate, also are illustrative of isocyanates which may be used. For example, the isocyanate-modified polyester formed by the reaction of polytetramethylene adipate (having a molecular weight of about 400) with an excess amount of diphenyl methane-p,p'-diisocyanate may be used as the isocyanate which is added to the plastisol composition to delay the reaction between the metal borohydride and water.

As pointed out in the said Bush application Serial No. 553,747, any plastisol may be used in the formation of the cellular material. As is well understood in the art, a plastisol is a dispersion of finely-divided vinyl chloride polymer in a liquid plasticizer for the vinyl chloride polymer. A plastisol normally contains at least 35 parts by weight of the liquid plasticizer for every 100 parts by weight of vinyl chloride polymer but frequently comprises as much as 300 to 400 or more parts by weight of the liquid plasticizer for every 100 parts by weight of vinyl chloride polymer. Dioctyl phthalate, butyl decyl phthalate, dioctyl adipate, dioctyl sebacate, tricresyl phosphate, trioctyl phosphate, didecyl phthalate, and acetyl tributyl citrate are liquid plasticizers commonly used in the formation of plastisols. Plastisols may have incorporated therein such additives as colorants, stabilizers, fillers and other modifying agents. The most commonly used plastisols contain polyvinyl chloride (a homopolymer of vinyl chloride) and/or copolymers of vinyl chloride with vinyl acetate, vinylidene chloride or maleic acid esters as the vinyl chloride polymer constituent.

As was mentioned in the said Bush application Serial No. 553,747, the amount of sodium borohydride, potassium borohydride, rubidium borohydride and/or cesium borohydride used with water, as a blowing agent for the plastisol will vary depending upon the amount of the borohydride which must be reacted with water to form an expanded plastisol of the desired density, more of the borohydride being required to form a cellular material of lower density than is required if a material of greater density is desired. The borohydride can be added in powder form directly to the plastisol, or may be dispersed in the liquid plasticiser of the plastisol and the dispersion added to the plastisol, or may be dissolved in water and the resultant aqueous solution of the borohydride added to the plastisol. Since borohydrides and water react together below a certain pH value, if the borohydride is to be added to the plastisol in an aqueous solution, the pH of the solution must be raised by the addition of an alkaline material to a pH at which the reaction between the borohydride and water does not tend to occur. Even when the borohydride is to be added to the plastisol in the form of a dry powder or as a dispersion of the borohydride in a liquid plasticiser, it is desirable to add sufficient alkali to the plastisol composition, or to the liquid plasticizer into which the borohydride has been dispersed, to prevent the borohydride from prematurely reacting with any water present with which it might accidently come in contact.

The water for reacting with the borohydride may be added to the plastisol either before or after the borohydride blowing agent is mixed into the plastisol or may be added simultaneously with the borohydride, either as a separate component or as a aqueous solution of the borohydride as previously described. Alternatively, separate plastisol components can be formed and the borohydride can be added to one of the plastisol components and the water added to the other plastisol component. The two plastisol compositions then can be mixed together to form a composite mixture just before they are to be used. Sufficient water should be present in the plastisol for reacting with the borohydride to form an expanded material of the desired density, but an excess amount of water in the plastisol normally is not desirable.

The isocyanate can be added either directly to the plastisol, or mixed with a liquid plasticizer for the vinyl chloride polymer of the plastisol and the mixture of isocyanate and plasticizer can be added to the plastisol. If the plastisol is formed into more than one compartment for compounding (as described above), the isocyanate can be added to either or both of the plastisol components. The amount of isocyanate desirable added to the plastisol composition will vary depending upon the amount of borohydride being used. It is theorized that the isocyanate combines in some manner through its (NCO)$^-$ group with the borohydride to form a complex, but the mechanism is not understood. Normally, the addition of from 0.1 part to 50 parts by weight of isocyanate produces a sufficient delay in the reaction between the borohydride and water to provide ample time to charge the plastisol composition into molds onto a conveyor belt before the expansion of the plastisol composition begins.

As indicated above, the rate of reaction between the borohydride and water in the plastisol can be accelerated either by heat or by adding an acidifying material to the plastisol. Any water-soluble acidic material may be used. Such materials are well known and include inorganic acids, carboxylic acids (particularly the stronger carboxylic acids such as acetic acid), amino acids and acid anhydrides. The amount of acidifying material added to the plastisol in order to increase the rate of reaction between the borohydride and water to the desired rate will vary depending upon the amount of water present in the plastisol and the drop in pH required.

The following examples are illustrative of the invention, and are not intended to limit nor circumscribe the scope thereof.

*Example I*

| Material: | Parts by weight |
| --- | --- |
| Vinyl chloride polymer | 100.0 |
| Dioctyl phthalate | 75.0 |
| Potassium borohydride | 0.7 |
| Water | 1.0 |

*Example I—Continued*

| Material: | Parts by weight |
| --- | --- |
| Toluene diisocyanate | 2.0 |
| 50% dispersion of phthalic anhydride in didecyl phthalate | 1.0 |

The vinyl chloride polymer and dioctyl phthalate are mixed together to form the plastisol. The pH of the water is adjusted to about 11 with sodium hydroxide and the potassium borohydride is dissolved therein. This aqueous solution of potassium borohydride is added to the plastisol along with the toluene diisocyanate. Finally, the acidifying material, phthalic anhydride, is added to the plastisol. Whereas expansion of the composition would occur immediately after the lowering of the pH of the system by the addition of the phthalic anhydride if the isocyanate were not added, the presence of the toluene diisocyanate delays the expansion from beginning for about 15 minutes. The composition was poured into a mold and after the plastisol had attained the desired expansion the mold was heated to a temperature of about 350° F. to gel and fuse the expanded plastisol. A cellular material having a density of about 12.5 pounds per cubic foot is formed.

*Example II*

| Material | Parts by Weight | |
| --- | --- | --- |
| | A | B |
| Vinyl chloride polymer | 100.0 | 100.0 |
| Octyl butyl phthalate | 50.0 | 50.0 |
| Diethylene glycol dibenzoate | 40.0 | 40.0 |
| Chemcell 303 [1] | 6.0 | |
| Phthalic anhydride | | 10.0 |
| Toluene diisocyanate | | 4.5 |

[1] A composition composed of 7.5 parts by weight of water, 1.5 parts by weight of sodium hydroxide, 1.0 part by weight of boric acid, 5.0 parts by weight of sodium borohydride and 1.6 parts by weight of absolute methanol.

The A and B component plastisol compositions are compounded separately in the usual manner and then equal parts by weight thereof are combined by mixing them together by means of an air-driven three-bladed propeller at 1600 r.p.m. for one minute. No foaming occurs at this time. The plastisol is poured onto a moving conveyor belt and is spread evenly over the face of the belt. At room temperature, foaming of the plastisol formulation begins about three minutes after mixing and is virtually completed at the end of seven minutes. The expanded material is gelled and fused at 345° F. yielding a cellular slab material of uniform cell structure having a density of about seven pounds per cubic foot.

*Example III*

| Material | Parts by Weight | |
| --- | --- | --- |
| | A | B |
| Vinyl chloride polymer | 100.0 | 100.0 |
| Octyl butyl phthalate | 40.0 | 40.0 |
| Diethylene glycol dibenzoate | 30.0 | 30.0 |
| Chemcell 303 | 4.5 | |
| Phthalic anhydride | | 4.0 |
| Toluene diisocyanate | 1.0 | |

The component plastisols A and B are compounded separately and are then admixed in equal proportions as in Example II. At room temperature the resulting composition did not begin to expand noticeably until about 15 minutes after the plastisol components (A and B) were mixed together. However, an immediate expansion may be initiated by heating the composite plastisol mixture. For example, a two-inch thick layer of the plastisol mix will start to expand immediately if heated to 130° F. and will be fully expanded after about five minutes. Gelation and fusion then are accomplished by heating the expanded plastisol at 350° F. A foamed vinyl sheet of fine uniform cell structure having a density of 9.5 pounds per cubic foot is obtained.

*Example IV*

| Material | Parts by Weight | |
|---|---|---|
| | A | B |
| Polyvinyl chloride polymer | 100.0 | 100.0 |
| Didecyl adipate | 20.0 | 20.0 |
| Diethylene glycol dibenzoate | 20.0 | 20.0 |
| Amyl decyl phthalate | 40.0 | 40.0 |
| Chemcell 303 | 4.5 | |
| Phthalic anhydride | | 4.0 |
| Mondur CB-75 (a polyisocyanate in ethyl acetate solution, with the (NCO)- content, based upon total weight, being about 12.5-13.5%) | 6.5 | |

The component plastisol compositions A and B are compounded separately and equal parts thereof are admixed as in Example II. At room temperature, expansion of the plastisol mixture begins about three minutes after the two plastisol compositions are intermixed and is virtually completed in seven minutes, yielding upon fusion at about 345° F. a vinyl foam of uniform cell structure having a density of about seven pounds per cubic foot.

The plastisol mix thus formulated did not begin to expand until about 15 minutes after the plastisol components were intermingled. The plastisol mix was spread on a moving conveyor belt and after expansion was fused at 350° F. A cellular material 1 inch thick and having a density of about 10 pounds per cubic foot resulted.

| Material | Example X | Example XI |
|---|---|---|
| | Parts by Weight | |
| Vinyl chloride polymer | 100.0 | 100.0 |
| Dioctyl phthalate | 80.0 | 80.0 |
| Toluene diisocyanate | 1.0 | 1.0 |
| 25% dispersion of rubidium borohydride in dioctyl phthalate | 2.0 | |
| 4% aqueous solution of acetic acid | 5.0 | |
| 50% dispersion cesium borohydride in dioctyl phthalate | | 1.5 |
| 4% aqueous solution of acetic acid | | 7.0 |

In each instance the polyvinyl chloride polymer, dioctyl phthalate, toluene diisocyanate and alkali metal borohydride dispersion are mixed together in the usual manner and the acetic acid solution is added to the resulting plastisol composition. The compositions then are charged

| Material | Example V | | Example VI | | Example VII | | Example VIII | |
|---|---|---|---|---|---|---|---|---|
| | Parts by Weight | | | | | | | |
| | A | B | A | B | A | B | A | B |
| Vinyl chloride polymer | 100.0 | 100.0 | 100.0 | 100.0 | 100.0 | 100.0 | 100.0 | 100.0 |
| Octyl butyl phthalate | 50.0 | 50.0 | 50.0 | 50.0 | 50.0 | 50.0 | 50.0 | 50.0 |
| Diethylene glycol dibenzoate | 30.0 | 30.0 | 30.0 | 30.0 | 30.0 | 30.0 | 40.0 | 40.0 |
| Chemcell 303 | 4.0 | | 4.0 | | 4.0 | | 3.0 | |
| Phthalic anhydride | | 4.0 | | 4.0 | | 4.0 | | 3.5 |
| Hylene TM-65 (a mixture of 65% 2,4-toluene diisocyanate and 35% 2,6-toluene diisocyanate, manufactured by Du Pont & Co.) | | 4.5 | | | | | | |
| Hylene TM-80 (a mixture of 80% 2,4-toluene diisocyanate and 20% 2,6-toluene diisocyanate, manufactured by Du Pont & Co.) | | | | 5.0 | | | | |
| Adiprene L (a glycol-based molecule, chain-extended, terminated with reactive isocyanate groups, manufactured by Du Pont & Co.) | | | | | | 20.0 | | |
| (A polymeric material resulting from the reaction of 100.0 parts by weight of polypropylene glycol being a diol of molecular weight 2025 and having a hydroxyl number 56, and 40.0 parts by weight of Hylene TM-65, and 4.0 parts by weight of hexane triol) | | | | | | | 10.0 | |

In Examples V, VI, VII and VIII, the plastisol components of each example are compounded in the usual manner and equal proportions of each component are admixed as in Example II. The plastisol mixture did not begin to expand at room temperature for about 5 minutes after mixing, although expansion thereof could be initiated at any prescribed time by heating the mixture at a temperature for example between 100–200° F. Gelation and fusion of the plastisol material in molds maintained at about 360° F. produced in each instance a cellular material of fine uniform cell size having a density of about 6 pounds per cubic foot.

*Example IX*

| Material | Parts by Weight | |
|---|---|---|
| | A | B |
| Vinyl chloride polymer | 60.0 | 100.0 |
| Vinyl chloride-vinylidene chloride copolymer | 40.0 | |
| Octyl butyl phthalate | 80.0 | 80.0 |
| (30 parts by weight sodium borohydride and 70 parts by weight 5% aqueous solution of sodium hydroxide) | 1.8 | |
| 50% phthalic anhydride dispersion in octyl butyl phthalate | | 6.0 |
| Toluene diisocyanate | | 1.0 |

The materials of each plastisol component are compounded together, following which equal parts of the A and B compositions are admixed in the usual manner.

into separate molds. The formulations thus formed did not begin to expand until about 15 minutes after being mixed. The expanded plastisols are fused at 325° F. and cellular products of fine uniform cell structure having a density of about 12 pounds per cubic foot are obtained.

From the foregoing examples it becomes readily apparent that the addition of an isocyanate to a plastisol delays the reaction of the alkali metal borohydride and water in the plastisol and thereby provides more time for the operator to charge the plastisol into molds or onto a moving conveyor belt before appreciable expansion of the plastisol composition has occurred.

It is clear that obvious modifications and variations of this invention may be made without departing from the spirit and scope of the invention as defined in the appended claims.

I claim:

1. A process for making a cellular material from a vinyl chloride polymer plastisol composition containing a vinyl chloride polymer and a liquid plasticizer for said vinyl chloride polymer which comprises adding to said plastisol composition (1) a chemical blowing agent selected from the group consisting of sodium borohydride, potassium borohydride, rubidium borohydride and cesium borohydride, (2) water for reacting with the said chemical blowing agent to produce hydrogen gas for expanding the said plastisol composition and (3) an isocyanate to delay the reaction between the said chemical blowing agent and the water to allow additional time before said plastisol composition commences to expand, said isocyanate having the structural formula $R(NCO)_x$ where R is an organic radical free of reactive hydrogen and $x$ is an integer, said chemical blowing agent and water being intermixed in said plastisol composition in the presence of said isocyanate, allowing said chemical blowing agent and water to react in said plastisol composition to expand said plastisol composition into a cellular mass, and heating the expanded plastisol composition to gel and fuse said expanded plastisol composition.

2. A process for making a cellular material from a vinyl chloride polymer plastisol composition containing a vinyl chloride polymer and a liquid plasticizer for said vinyl chloride polymer which comprises adding to said plastisol composition (1) a chemical blowing agent selected from the group consisting of sodium borohydride, potassium borohydride, rubidium borohydride and cesium borohydride, (2) water for reacting with the said chemical blowing agent to produce hydrogen gas for expanding the said plastisol composition and (3) an isocyanate to delay the reaction between the said chemical blowing agent and the water to allow additional time before said plastisol composition commences to expand, said isocyanate having the structural formula $R(NCO)_x$ where R is selected from the group consisting of polyvalent aromatic organic radicals, polyvalent aliphatic organic radicals and polyvalent alicyclic organic radicals and $x$ is an integer, said chemical blowing agent and water being intermixed in said plastisol composition in the presence of said isocyanate, allowing said chemical blowing agent and water to react in said plastisol composition to expand said plastisol composition into a cellular mass, and heating the expanded plastisol composition to gel and fuse said expanded plastisol composition.

3. A process for making a cellular material from a vinyl chloride polymer plastisol composition containing a vinyl chloride polymer and a liquid plasticizer for said vinyl chloride polymer which comprises adding to said plastisol composition (1) a chemical blowing agent selected from the group consisting of sodium borohydride, potassium borohydride, rubidium borohydride and cesium borohydride, (2) water for reacting with the said chemical blowing agent to produce hydrogen gas for expanding the said plastisol composition and (3) an isocyanate to delay the reaction between the said chemical blowing agent and the water to allow additional time before said plastisol composition commences to expand, said isocyanate having the structural formula $R(NCO)_x$ where R is a divalent aromatic organic radical and $x$ is the integer 2, said chemical blowing agent and water being intermixed in said plastisol composition in the presence of said isocyanate, allowing said chemical blowing agent and water to react in said plastisol composition to expand said plastisol composition into a cellular mass, and heating the expanded plastisol composition to gel and fuse said expanded plastisol composition.

4. A process for making a cellular material from a vinyl chloride polymer plastisol composition containing a vinyl chloride polymer and a liquid plasticizer for said vinyl chloride polymer which comprises adding to said plastisol composition (1) a chemical blowing agent selected from the group consisting of sodium borohydride, potassium borohydride, rubidium borohydride and cesium borohydride, (2) water for reacting with the said chemical blowing agent to produce hydrogen gas for expanding the said plastisol composition and (3) toluene-2,4-diisocyanate to delay the reaction between the said chemical blowing agent and the water to allow additional time before said plastisol composition commences to expand, said chemical blowing agent and water being intermixed in said plastisol composition in the presence of said isocyanate, allowing said chemical blowing agent and water to react in said plastisol composition to expand said plastisol composition into a cellular mass, and heating the expanded plastisol composition to gel and fuse said expanded plastisol composition.

5. A process for making a cellular material from a vinyl chloride polymer plastisol composition containing a vinyl chloride polymer and a liquid plasticizer for said vinyl chloride polymer which comprises adding to said plastisol composition (1) a chemical blowing agent selected from the group consisting of sodium borohydride, potassium borohydride, rubidium borohydride and cesium borohydride, (2) water for reacting with the said chemical blowing agent to produce hydrogen gas for expanding the said plastisol composition and (3) an isocyanate to delay the reaction between the said chemical blowing agent and the water to allow additional time before said plastisol composition commences to expand, said isocyanate having the structural formula $R(NCO)_x$ where R is an organic radical free of reactive hydrogen and $x$ is an integer, said chemical blowing agent and water being intermixed in said plastisol composition in the presence of said isocyanate, heating said plastisol composition to a temperature below the temperature at which the said plastisol composition gels to catalyze the reaction between the said chemical blowing agent and water in said plastisol composition to expand the said plastisol composition into a cellular mass, and heating the expanded plastisol composition to gel and fuse said expanded plastisol composition.

6. A process for making a cellular material from a vinyl chloride polymer plastisol composition containing a vinyl chloride polymer and a liquid plasticizer for said vinyl chloride polymer which comprises adding to said plastisol composition (1) a chemical blowing agent selected from the group consisting of sodium borohydride, potassium borohydride, rubidium borohydride and cesium borohydride, (2) water for reacting with the said chemical blowing agent to produce hydrogen gas for expanding the said plastisol composition and (3) an isocyanate to delay the reaction between the said chemical blowing agent and the water to allow additional time before said plastisol composition commences to expand, said isocyanate having the structural formula $R(NCO)_x$ where R is an organic radical free of reactive hydrogen and $x$ is an integer, said chemical blowing agent and water being intermixed in said plastisol composition in the presence of said isocyanate, adding an acidifying material to the said plastisol composition to catalyze the reaction between the said chemical blowing agent and water in said plastisol composition to expand the said plastisol composition into a cellular mass, and heating the expanded plastisol composition to gel and fuse said expanded plastisol composition.

7. A process for making a cellular material from a vinyl chloride polymer plastisol composition containing a vinyl chloride polymer and a liquid plasticizer for said vinyl chloride polymer which comprises adding to said plastisol composition (1) a chemical blowing agent selected from the group consisting of sodium borohydride, potassium borohydride, rubidium borohydride and cesium borohydride, (2) water for reacting with the said chemical blowing agent to produce hydrogen gas for expanding the said plastisol composition, said chemical blowing agent and water being added to said plastisol composition as an aqueous solution having a pH sufficiently high that the said solution is essentially stable, and (3) an isocyanate to delay the reaction between the said chemical blowing agent and water when catalyzed to allow additional time before said plastisol composition commences to expand, said isocyanate having the structural formula $R(NCO)_x$ where R is an organic radical free of reactive hydrogen and $x$ is an integer, adding an acidifying material to the said plastisol composition to catalyze the reaction between the said chemical blowing agent and water in said plastisol composition to expand the said plastisol composition into a cellular mass, and heating the expanded plastisol composition to gel and fuse said expanded plastisol composition.

8. A process for making a cellular material from a vinyl chloride polymer plastisol composition containing a vinyl chloride polymer and a liquid plasticizer for said vinyl chloride polymer which comprises adding a chemical blowing agent selected from the class consisting of sodium borohydride, potassium borohydride, rubidium borohydride and cesium borohydride to a vinyl chloride polymer plastisol composition, adding (1) water for reacting with the said chemical blowing agent to produce hydrogen gas and (2) an isocyanate having the structural formula $R(NCO)_x$ where R is an organic radical free of reactive hydrogen and $x$ is an integer to a second vinyl chloride polymer plastisol composition, admixing the two plastisol compositions together to produce a plastisol blend, said isocyanate delaying the reaction between the said chemical blowing agent and water when admixed to allow additional time before said plastisol blend commences to expand, allowing said plastisol blend to expand into a cellular mass, and heating the expanded plastisol composition to gel and fuse the expanded mass.

9. A process for making a cellular material from a vinyl chloride polymer plastisol composition containing a vinyl chloride polymer and a liquid plasticizer for said vinyl chloride polymer which comprises adding to a vinyl chloride polymer plastisol composition (1) a chemical blowing agent selected from the group consisting of sodium borohydride, potassium borohydride, rubidium borohydride and cesium borohydride, (2) water for reacting with the said chemical blowing agent to produce hydrogen gas, said chemical blowing agent and water being added to said plastisol composition as an aqueous solution having a pH sufficiently high that the said solution is essentially stable, and (3) an isocyanate to delay the reaction between the said chemical blowing agent and water when catalyzed to allow additional time before expansion commences, said isocyanate having the structural formula $R(NCO)_x$ where R is an organic radical free of reactive hydrogen and $x$ is an integer, adding an acidifying material to a second vinyl chloride polymer plastisol composition, admixing the two plastisol compositions together to produce a plastisol blend, allowing said plastisol blend to expand into a cellular mass, and heating the expanded plastisol composition to gel and fuse the expanded mass.

References Cited in the file of this patent

UNITED STATES PATENTS

| | | |
|---|---|---|
| 2,909,493 | Bush | Oct. 20, 1959 |
| 2,915,496 | Swort et al. | Dec. 1, 1959 |

FOREIGN PATENTS

| | | |
|---|---|---|
| 785,256 | Great Britain | Oct. 23, 1957 |
| 805,167 | Great Britain | Dec. 3, 1958 |

UNITED STATES PATENT OFFICE
CERTIFICATE OF CORRECTION

Patent No. 3,084,127                           April 2, 1963

Walter J. Vakousky

It is hereby certified that error appears in the above numbered patent requiring correction and that the said Letters Patent should read as corrected below.

Column 2, line 22, for "disphenylmethane-p'-diisocyanate" read -- diphenylmethane-p'-diisocyanate --; column 3, line 40, for "compartment" read -- component --; line 43, for "desirable" read -- desirably --; line 52, after "molds" insert -- or --.

Signed and sealed this 1st day of October 1963.

(SEAL)
Attest:

ERNEST W. SWIDER                      DAVID L. LADD

Attesting Officer                        Commissioner of Patents